United States Patent
Duarte Lanna et al.

(10) Patent No.: US 11,147,293 B2
(45) Date of Patent: Oct. 19, 2021

(54) NUTRITIONAL COMPOSITION FOR INCREASING MILK PROTEIN IN MAMMALS

(75) Inventors: Dante Pazzanese Duarte Lanna, Piracicaba (BR); Mark A. McGuire, Moscow, ID (US); Sergio Raposo de Medeiros, Piracicaba (BR); Dimas Estrasulas de Oliveira, Piracicaba (BR); Luis Januario M. Aroeira, Minas Gerais (BR)

(73) Assignee: Fundacao De Amparo A Pesquisa Do Estado De Sao Paulo, Sao Paulo (BR)

( * ) Notice: Subject to any disclaimer, the term of this patent is extended or adjusted under 35 U.S.C. 154(b) by 1497 days.

(21) Appl. No.: 12/175,716

(22) Filed: Jul. 18, 2008

(65) Prior Publication Data

US 2009/0017158 A1    Jan. 15, 2009

Related U.S. Application Data

(62) Division of application No. 10/489,186, filed as application No. PCT/BR02/00003 on Jan. 9, 2002, now abandoned.

(30) Foreign Application Priority Data

Jan. 12, 2001    (BR) .............................. PI 0100421-2

(51) Int. Cl.
   *A23K 50/10*        (2016.01)
   *A23K 20/158*       (2016.01)

(52) U.S. Cl.
   CPC ............ *A23K 50/10* (2016.05); *A23K 20/158* (2016.05)

(58) Field of Classification Search
   None
   See application file for complete search history.

(56) References Cited

U.S. PATENT DOCUMENTS

| | | | |
|---|---|---|---|
| 5,004,728 A | | 4/1991 | Chalupa et al. |
| 5,804,210 A | * | 9/1998 | Cook et al. ................... 424/440 |
| 6,020,377 A | * | 2/2000 | O'Quinn et al. ............. 514/560 |
| 6,710,032 B1 | | 3/2004 | Teter et al. |

FOREIGN PATENT DOCUMENTS

| | | | |
|---|---|---|---|
| WO | WO 9818751 A1 | * | 5/1998 |
| WO | 0057720 | | 10/2000 |

OTHER PUBLICATIONS

Piperova, Liliana, et al, Mammary Lipogenic Enzyme Activity, trans Fatty Acids and Conjugated Linoleic Acids Are Altered in Lactating Dairy Cows Fed a Milk Fat-Depressing Diet, The Journal of Nutrition, vol. 130, pp. 2568-2574 (2000).*

Ackerson, Barbara, et al, Effects of Treatment of Whole Fat Soybeans or Soy Flour with Formaldehyde to Protect the Polyunsaturated Fatty Acids from Biohydration in the Rumen, The Journal of Nutrition, vol. 106, Issue 10, pp. 1383-1390 (1976).*
Chin et al. (Conjugated Linoleic Acid Is a Growth Factor for Rats as Shown by Enhanced Weight Gain and Improved Feed Efficiency. Biochemical and Molecular Roles of Nutrients.1994).*
Pieper et al. (Natural solutions for sexual enhancement: increase the energy in your sex life with alternatives to drug therapy. 1998).*
Staples et al. (Symposium: Optimizing Energy Nutrition For Reproducing Dairy Cows. Influence of Supplemental Fats on Reproductive Tissues and Performance of Lactating Cows. J Dairy Sci. 1998. 81:856-871).*
Bee (Dietary Conjugated Linoleic Acids Alter Adipose Tissue and Milk Lipids of Pregnant and Lactating Sows. J. Nutr. Sep. 1, 2000 vol. 130 No. 9 2292-2298).*
Chin et al. (Conjugated linoleic acid is a growth factor for rats as shown by enhanced weight gain and improved feed efficiency. J Nutr. Dec. 1994;124(12):2344-9).*
Ackerson et al., Effects of Treatment of Whole Fat Soybeans or Soy Flour with Formaldehyde to Protect the Polyunsaturated Fatty Acids from Biohydrogenation in the Rumen, Journal of Nutrition, 106:10 (1976), 1383-1390.
Kelly et al., Dietary Fatty Acid Sources Affect Conjugated Linoleic Acid Concentrations in Milk from Lactating Dairy Cows, Journal of Nutrition, 128:5 (1998), 881-885.
Loor et al., Exogenous Conjugated Linoleic Acid Isomers Reduce Bovine Milk Fat Concentration and Yield by Inhibiting De Novo Fatty Acid Synthesis, Journal of Nutrition, 128:12 (1998), 2411-2419.
Piperova et al., Mammary Lipogenic Enzyme Activity, trans Fatty Acids and Conjugated Linoleic Acids Are Altered in Lactating Dairy Cows Fed a Milk Fat-Depressing Diet, Journal of Nutrition, 130 (2000), 2568-2574.
Teh et al., Varying Amounts of Rumen-Inert Fat for High Producing Goats in Early Lactation, Journal of Dairy Science, 77:1 (1994), 253-258.
Office Action of Apr. 17, 2007, in related U.S. Appl. No. 10/489,186.
Office Action of Jan. 23, 2008, in related U.S. Appl. No. 10/489,186.
Baumgard, L.H. et al., "Identification of the conjugated linoleic acid isomer that inhibits milk at synthesis," Am. J. Physiol. Regulatory Integrative Comp. Physiol. (2000) 278:R179-R184.
Blankson, H. et al., "Conjugated Linoleic Acid Reduces Body Fat Mass in Overweight and Obese Humans," The Journal of Nutrition (2000) 2943-2948.

(Continued)

*Primary Examiner* — Layla Soroush
(74) *Attorney, Agent, or Firm* — Wood Herron & Evans LLP

(57) ABSTRACT

A process for obtaining an increase in the concentration and/or production of milk protein and/or improving reproductive performance. The process includes administering to a mammal a composition including at least one unsaturated fatty acid, or a derivative thereof, and at least one feed supplement, wherein the combination is administered in an amount such that the mammal absorbs 1 g to 95 g of the at least one unsaturated fatty acid, or the derivative thereof, per day.

9 Claims, 1 Drawing Sheet

(56) References Cited

OTHER PUBLICATIONS

Pariza, M.W. et al., "The biologically active isomers of conjugated linoleic acid," Progress in Lipid Research (2001) 40:283-298.
Perfield, J.W. et al., "Effects of Dietary Supplementation of Rumen-Protected Conjugated Linoleic Acid in Dairy Cows during Established Lactation," J. Dairy Sci. (2002) 85:2609-2617.

* cited by examiner

NUTRITIONAL COMPOSITION FOR INCREASING MILK PROTEIN IN MAMMALS

CROSS REFERENCE TO RELATED APPLICATIONS

This application is a division of, and claims the benefit of, U.S. patent application Ser. No. 10/489,186, filed Sep. 23, 2004, which is a U.S. national stage application, under 35 U.S.C. § 371, of International Application No. PCT/BR02/00003, filed Jan. 9, 2002, which claims priority to Brazilian Patent Application No. PI 0100421-2, filed Jan. 12, 2001, the disclosures of which are incorporated by reference herein in their entireties.

AREA OF THE INVENTION

This invention refers to a process for obtaining increased milk production and/or increased concentration of protein in milk, also improving reproductive performance using a mixture of fatty acids with or without additional proteins and which will be used in agriculture and animal nutrition (including human beings), enabling higher levels of milk and/or protein production per area and/or per animal and/or per period of time and/or in each lactation period. The process allows for an increase in the concentration of protein in milk and/or increased milk production depending on the conditions of the production system as described in different examples. The process also allows for improved industrial dairy product quality and yields.

BASIS OF THE INVENTION

This invention pertains to the area of human or animal nutrition, with excellent possibilities for the production of ruminant feed supplements and a process for obtaining higher levels and production of milk protein using a mixture of fatty acids, which generally require diets formulated with adequate levels of supplemental protein which can be metabolized. An adequate level of metabolizable protein in this case is equivalent to levels over and above those indicated by the usual formulation systems (NRC, 2000; AFRC, 1993; CSIRO, 1991; CNCPS, 2000).

However, the process can be implemented by using normal levels of dietary proteins if the diet is formulated to provide high levels of protein which can be metabolized, arriving in the intestine using sources with low levels of ruminal degradability and/or diets with high production levels of microbial protein.

In ruminants, such as cattle, sheep and goats, the composition of the milk is the result of animal genetics and environmental conditions. Of these environmental conditions, nutrition is the most influential factor in concentration of milk components. The components usually measured are: fat, protein, lactose, total solids and minerals. The two first items are the components with the heaviest economic contribution. The level of fat is more easily altered through external factors than protein, which normally varies to a lesser degree.

Despite the ability to use dietary formulation to reduce the level of fat in milk, this type of approach has several inconvenient circumstances, such as the need to use high levels of concentrate, animal discomfort and/or risk of metabolic problems and less control on the degree of the reduction in milk fat content. Apart from this, there is little or no effect on other milk components. The rise in milk protein levels is highly desirable, being a highly valued component, which can significantly increase production yields for dairy products, such as some cheeses. Increases in milk protein level accomplished by changes in dietary composition considered currently to be state of the art were very low or inconsistent, until the present time.

The Current Situation of the Technique and the Invention

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION

Figure 1:
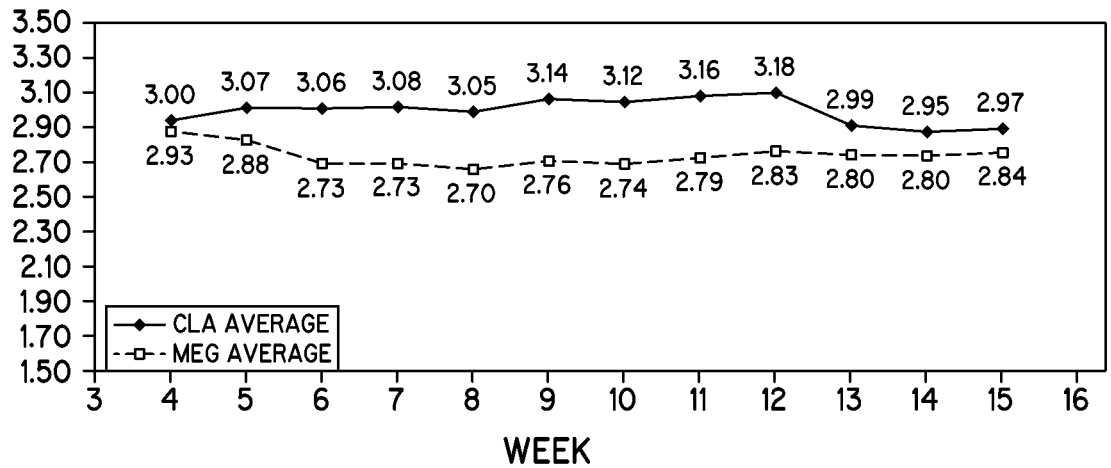
FIG. 1 is a graph showing levels of protein in a group of ruminants given feed supplemented with conjugated linoleic acid (CLA) and in a control group (MEGALAC), with the dietary effect being shown from the fourth week to the eleventh week, and the residual effect being shown from the twelfth week to the fifteenth week.

The small and inconsistent variations resulting from protein supplements may be due to a low conversion efficiency of dietary protein into milk protein of around 25-30%. (Bequette, B. J.; Backwell, F. R. C.; Crompton, L. A., Current concepts of amino acid and protein metabolism in the mammary gland of the lactating ruminant, J. Dairy Sci. Vol. 81 p. 2540-2559, 1998).

Kennely, J. J.; Grimm, D. R.; Ozimek, L.; Milk composition in the cow, Proceedings of the 1999 Cornell Nutrition Conference for Feed Manufacturers, 61 st. Meeting, Cornell University, 1999, comments that the lack of understanding of how dietary protein influences its level and milk production is the main limitation in formulating biologically efficient diets which would also be more cost effective. The difficulties observed in altering milk production by using different protein sources is made clear in the review by Huber, J. T., Santos, F. P.; Simas, J. M.; Chen, K. H.; Mens, H.; Santos, J. E.; Modern Concepts for diet formulating for high production cows, Annals of the 2nd Brazilian Dairy Cattle Congress-Modern Concepts of Dairy Exploration Jose Carlos de Moura (ed), FEALQ, 1996), in which 97 comparisons of 67 lactation tests published in 60 studies with data obtained from soy meal vs. protein sources of low rumen degradability, shows that milk production and protein levels were not generally improved. These authors comment that only in studies using fish meal offered to cows with production of over 30 kg of milk per day demonstrated some significant increases in milk production, as seen in 6 of 13 comparisons. In table 4 of the review from Huber et al, (1996), we can see that only 6 studies of the 95 comparisons showed any positive effect, or increase on the percentage of milk protein.

Milk fat is the most sensitive component to dietary changes for animals. (Sutton, J. D., Altering milk composition by feeding, J. Dairy Sci vol 72 p. 2801-2814, 1989; see also Kennely et al., 1999). There are situations which lead to a significant drop in fat, a phenomenon which is known as the low fat milk syndrome or milk fat depression (milk fat depression—MFD). The reduction in milk fat may or may not pose a problem to the farmer. However, MFD is most often caused by nutritional problems, linked with sub-clinical acidosis, reduced nutritional efficiency and health problems that it may be linked (diarrhea, laminitis, abomasum dislocation) render MFD a problem in dairy farming.

Kennely, J. J.; Glimm, D. R., The biological potential to alter milk composition, Canadian J. of An. Sci., vol. 78 (suppl), p. 23-56, 1998, present data on diets with ratios of 50:50 and 75:25 between concentrates and roughage, respectively, and the influence of the stage of lactation on milk composition. At the start and end of lactation, high levels of concentrate reduce fat levels. The amount of protein was higher in diets with reduced fat (i.e., 75% concentrate), but the difference was only statistically different at the beginning of lactation. In this case, however, milk production was 2.4 kg/day lower than with the 50:50 treatment. This shows how, up until this invention, dietary manipulation of milk protein composition presented small and inconsistent results, and with uncoordinated alterations in milk production, fat and protein levels.

Lipid supplements do not always alter milk protein content, despite the fact that in most cases they reduce protein levels (De Peters, E. J.; Cant, J. P.; Nutritional factors influencing the nitrogen composition of bovine milk; a review, J. Dairy Sci., vol. 75, p. 2043-2070, 1992).

Pat. WO99/66922 describes a means of altering milk quality by administering conjugated linoleic acid (CLA) and their fatty acid precursors, whose advantages are lower fat levels and greater CLA levels in the milk produced. Pat. WO94/16690 describes a method for increasing animal production efficiency using CLA, or their precursory fatty acids. These two patents (WO99/66922; WO94/16690), however, contain no reference to an increase in the volume of milk produced nor any reference to an increase in milk protein or an increase in protein production (per animal, per period, per area or per feed quantity).

Recent publications ("The Power Behind Cheese", The Food Institute, www.findarticles.com), cite properties of conjugated linoleic acid which reduce the processes of some types of cancer and cardiac problems, and also make it easier to reduce the level of fat in tissue growth.

This invention deals with a product (based on specific fatty acids) used to increase the level of protein in milk and a process (the formulation of animal supplements) to obtain increased milk production with higher levels of protein.

The invention aimed to:

develop a product which increased yields for milk derivatives and improve the quality of the dairy products, such as cheese, as a result of improved protein levels and/or quantity;

obtain products with improved milk quality in terms of consumer health, reduction of short chain fatty acids and the ratio between short chain fatty acids/proteins;

develop products which improve the condition of the body and mammal reproduction performance;

obtain a product which improves milk production efficiency and reduces the activity's environmental impact (reducing, for example, the production of manure and methane per unit of milk volume). This is the function of altering protein levels (increasing them) and fat levels (reducing them) in milk.

This invention aims to enable an increase in milk protein levels and production of 6 to 14% (example 1) solely with the addition of a metabolic modifier (fatty acid) and this increase can be maximized by altering (increasing) the metabolized protein/energy ratio. This means that this invention provides a more efficient and economic means for feeding mammals and particularly ruminants in order to obtain higher levels of milk and/or protein production and improve reproductive performance.

The Petitioner therefore developed a feed product and a process for mammals which aims to increase the level and/or production of protein in milk and also improve reproductive performance, characterized by the inclusion of one or more unsaturated fatty acids which may have 18 carbon atoms in the molecule or its derivatives to modify the metabolism, associated or not with one or more animal or vegetable oils which can be presented as a combination with one or more feed supplements with different metabolic protein/energy ratios and optional taste modifiers, coloring agents, vitamins, minerals, conditioners, stabilizers or other recognized additives.

Specifically, the product and the process involve supplementation of specific types of fatty acids such as conjugated linoleic acid (raw formula $C_{18}H_{32}O_2$), CLA.

The structure of the principal isomer is as follows:

$CH_3(CH_2)_5CH=CHCH=CH(CH_2)_7COOH$

Geometric and positioning isomers can be used, including C 18:2 cis 9, trans 11, C 18:2 trans10, cis 12, and C 18:2 cis 8, trans 10 in varying proportions, as well as purified fatty acids such as C 18:2 trans 10, cis 12, especially specific isomers, of conjugated linoleic acid, trans isomers in position 10, with or without ruminal protection for ruminants. Isomers of linoleic acid and its mixtures can be used, such as salts (calcium, etc.) or esters, among others. We will refer to all of these possibilities as CLA, i.e., mixtures or isolated isomers of linoleic acid or its derivatives. The CLA may or may not be used in conjunction with one or more vegetable oils known in technical circles as palm oil. This supplement can be used in association with other feed supplements, including supplements, which present a metabolizable protein/energy ratio which is higher than that normally seen as adequate in technical circles for use with animals and supplementation with the CLA molecule with its metabolic modification. Around 0.5 to 90% mass of one or more of the unsaturated carboxylic acids are used, which contain 18 carbon atoms in the molecule (active ingredient) in relation to the total mass of lipids added to the feed or diet, and this means that 0.5% would correspond to 20 g of protected CLA in 4 kg of feed and 80% would correspond to the same 20 g of a base that could be a premix.

The Petitioner has also developed a process to obtain increased production and/or content of protein in milk characterized by animal feeds which contain one or more unsaturated fatty acids which have 18 carbon atoms in the molecule or its derivatives to modify the metabolism, associated or not with one or more animal or vegetable oils which can be presented as a combination of one or more feeds and/or supplements with different metabolizable protein/energy ratios and optional taste modifiers, coloring agents, vitamins, minerals, conditioners, stabilizers or other recognized additives, in quantities which enable the mammal to absorb from 1 to 95 grams of one or more fatty acids per day containing 18 carbon atoms in its molecule.

These increases are obtained using doses which vary in proportion to the active ingredient (specific max of fatty acids) in the supplement which has been protected against ruminal degradation. The quantity absorbed by the intestines must be around 1 to 20 grams per animal per day. As an example: a mixture of fatty acids used with different proportions of active ingredient can be supplemented in quantities of 20 to 50 g/100 kg liveweight in the entire diet or in a specific portion of the diet or even a mixture of fatty acids which is ingested in the protected form using quantities of 31.5 g/100 kg liveweight for animals grazing on pasture and using a concentrate or multiple supplement, i.e., a mixture of fatty acids using different percentages of active ingredients which are ingested in protective form using quantities of 0.01 to 2.5 g per day per kilo of liveweight, or 0.01 to 0.15 grams of active ingredient absorbed per day per kilo of liveweight for grazing animals, added to a concentrate or multiple supplement.

However, depending on the means of supply of these fats to the animal, the quantity supplied in the diet could rise as to compensate for biohydrogenation and other losses. Despite the ruminal protection, losses of up to 90% of the active molecule may occur. For example, if the recommended dosage of 10 g of the acid c 18:2 trans10, cis 12, and of the commercial product presents 50% of c 18:2 trans 10, cis 12 and the losses in the digestive system reach 90%, then the amount to be added to the diet is calculated as $10 \div 0.5 \div 0.9 = 200$ g/d.

In the manner in which it is used here, the term "ruminal protection" refers to any process which reduces biohydrogenation of fatty acids or degradation of proteins and increases the level of fatty acids and amino acids arriving in the animal's lower digestive tract unaltered or not degraded. Higher levels of metabolizable protein are those which are above the recognized demands in the state of the art formulation system (see NRC review, 2001 and CNCPS, 2000). It should be emphasized that this refers mainly to the metabolizable protein/energy ratio and not necessarily the level of dietary protein (although this may be higher than recommended levels depending on the ingredients).

The feed supplement from this invention may include the use of sources of by-pass proteins in the rumen provided by the low rumen degradation supplement (example: fish meal) which alters the energy/metabolizable protein ratio. An example presented below shows how the use of these sources of protein in combination with the CLA molecule with a metabolic effect improving the effects of the latter, a fact shown for the first time by the inventors requesting this patent. Protein sources include oil seed meals, such as soybean meal and cottonseed meal, animal by-products, such as meat meals, feather and offal meals, blood meal and fish meal; vegetable by-products such as wheat middlings, soybean husks, corn processing by-products and microbial proteins, such as yeast. Other ingredients, beside the protein sources, can also be present in the feed supplement. These would include energy sources, such as corn, citrus pulp, sorghum, flavourings, such as molasses, coloring agents, vitamins and minerals and various conditioners and stabilizers.

The protein components of the supplement for this invention can be protected from ruminal degradation by various methods, such as chemical and heat treatment, or a combination of heat and other treatments. Chemical treatment of feeds with tannin is described in U.S. Pat. No. 3,507,662. Chemical treatment of feeds with formaldehyde is described in U.S. Pat. No. 3,619,200. Heat treatment of feeds includes oil seed processing with extruders, roasting and infrared treatments. The addition of reducing sugars to feeds such as soybean meal before heating is described in U.S. Pat. Nos. 4,377,576, 5,023,091 and 5,064,665.

The diet can be formulated to provide an excess metabolizable protein mass of 10% to 50%, carried out in compliance with the CNCPS program (Version 3.0 and/or 4.0) from Cornell University or other simulation model used in this area. Several combinations and systems for calculation can be used to allow increased quantities of amino acids in the abomasum, including the use of amino acids and proteins protected from ruminal degradation of different protein sources.

The feed supplement is typically supplied to the milk producing animal in combination with bulk feeds. These feeds can be conserved fodders, such as hay or silage, and fodder grazed directly by the animal or other fibrous material, such as sugar cane by-products processed by pressure and/or steam treatment or in their natural state.

The set of ingredients in the animal diet is composed in a manner that the animal receives the mixture of fatty acids and a level of metabolizable protein in accordance with milk production with higher protein levels which results in higher total and protein production. Therefore, feeds are formulated with mixtures of fatty acids and adequate levels of metabolizable protein in the process of increasing milk and/or protein level production using a mixture of fatty acids.

The process involves supplements of certain types of specific fatty acids with and/or without ruminal protection and, in general, a diet with a metabolizable protein/energy ratio above levels required by the state of the art.

The invention also refers to the ability to supplement or feed mammals with substances which can create metabolic modifiers in the digestive tract similar to those described above, according to the invention, i.e., the unsaturated carboxylic acids can be used in combination with different feed components including fermentable carbohydrate sources, proteins, additives, antibiotics, ingredients which may alter digestive tract pH producing fatty acids which alter the metabolism in the digestive tract, from fatty acids added to the diet which themselves do not alter the metabolism prior to the conversion caused by the different feed components, according to the invention.

The supplementation may involve supplying fatty acids, which alter the animal's metabolism, or along with the supply of inert fatty acids which, because of ruminal conditions, can change their molecular structure and become fatty acids which alter metabolism. Both the supply of fatty acids which have a metabolic effect and the production of this fatty acid in the digestive tract enables substantial increase in the level and/or production of milk proteins.

The significant increase in milk protein concentration and production provides substantial gains in yield, quality and production of dairy products. Supplementation with specific fatty acids also increases the length of the lactation period, reproductive efficiency and recovery of body conditioning with consequent increases in milk production and constituents after supplementation. There is also a better ratio between protein and short chain fatty acid contents, improving the nutritional value of the milk.

This invention provides the following advantages:

supplementation can increase milk production during the lactation period, and the duration of this period (production along the lactation curve), increasing production of milk components throughout the post-supplementation period with the mixture of fatty acids described in this petition (set of isomers of conjugated linoleic acids), and the extent of this effect is the result of the animal's nutritional conditions when treatment begins;

according to the invention, the effects of the fatty acid mixture include improved energy balance, improved body condition, reduction of period of time to first estrus (i.e., decreases days open) and general improvement in reproduction parameters;

increased production and levels of protein resulting from increased levels of true protein;

the effects of the fatty acid mixture when used according to the invention include a reduction in metabolic problems including ketosis and fatty liver; improvements in dairy product quality and industrial yields;

increase the ratio of proteins/short chain fatty acids and the total lipids/short chain fatty acid ratio, improving the nutritional value of the milk in line with current dietary recommendations.

The following examples illustrate certain uses of this invention. All of the percentages indicated relate to weight, unless otherwise noted. Although the invention has been described in detail in the following examples, they are only illustrative. Many variations and modifications can be created by those who are technically involved in these issues within the spirit and scope of the invention.

Example 1

A group of 10 cows received 150 g of a mixture of fatty acids as calcium salts with 60% CLA (conjugated linoleic acid, CLA, a mixture of geometric and positioning isomers including C18:2 cis 9, trans 11, C18:2 trans 10, cis 12, and C18:2 cis 8, trans 10) for 56 days, whose milk production and composition values were compared with 10 cows with the same characteristics, handled in the same manner and which received the control diet. The control treatment consisted of 150 g of fatty acid mixture as conventional calcium sales (MEGALAC, fatty acids from palm oil) for the same period. The period of 56 days is equivalent to the "Treatment Effect" period. The animals had an average 4 week lactation period when they began receiving the two treatments. The 20 animals grazed on tropical grass and were supplied with a feed complement which was a balanced concentrate supplied in the feed bunkers (4 kg per head per day). This concentrate was specially balanced with various protein sources (soybean meal, wheat middlings, fish meal) to provide a lower energy/metabolizable protein ratio than normally required in various formulation systems. In this specific case CNCPS (Version 3.0 and/or 4.0) from Cornell University was used to calculate the ratio, but other systems such as CSIRO and AFRC present similar results. There was a specific plan for a 10 to 20% increase in metabolizable protein compared with requirements to ensure that the fatty acid mixture effects could be achieved.

The same animals were evaluated for another 28 days, after the supplement had been withdrawn, to evaluate the residual effects of the diet. During this period, all the animals received the same management conditions received during the CLA treatment period, except for the substitution of the specially formulated feed supplement for a conventional commercial concentrate.

The results of the protein levels can be seen in Table 1.1:

TABLE 1.1 percentage of milk protein in animals receiving the CLA compared with the control diet during 56 days and other residual effects.

| | Periods Effect during supplementation period | Residual effect |
|---|---|---|
| Number of days | 56 | 28 |
| CLA | 3.08% | 3.02% |
| CONTROL | 2.78% | 2.82% |

The analysis of the data in Table 1.1 clearly shows that including CLA in a diet composed of grass and a balanced concentrate, as described above, results in a 10.79% increase in the level of milk proteins. The average levels of the "Residual Effect" period during which the animals did not receive CLA for 28 days was still 7.09% higher than the Control group of animals.

In FIG. 1 attached, the alteration over time shows the levels of protein with CLA (--•--) and the control group (MEGALAC; --☐--) from the 4th to the 11th week (Dietary Effect) and the 12th to 15th weeks (Residual Effect). It is clear that the CLA maintains higher levels of protein during the supplementation period. The figure also shows that the level of protein falls sharply in week 13, when the animals no longer received the fatty acid mixture for one week. Even so, there was a constant residual effect equivalent to around half of the effect of the treatment period through the entire "Residual Effect" period.

Figure 2:
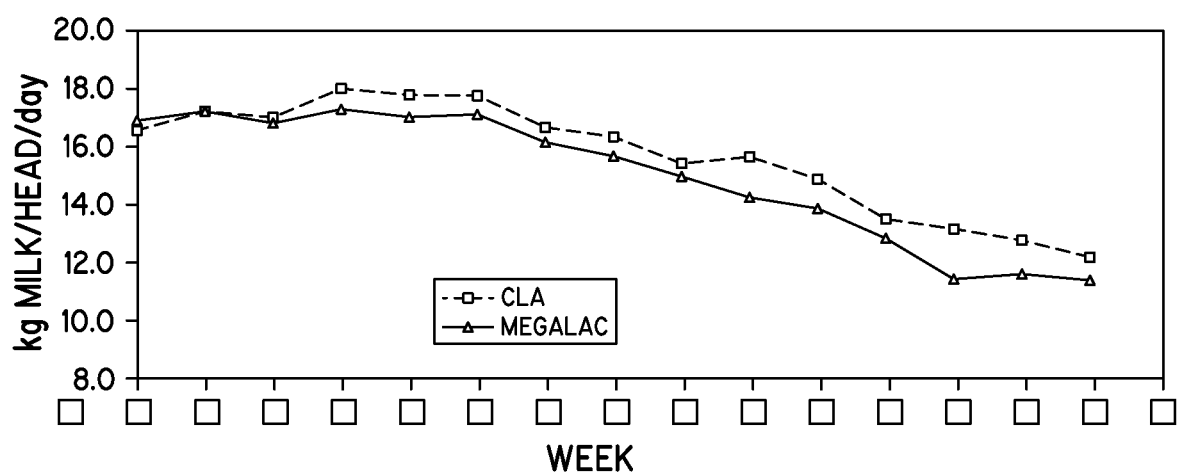
FIG. 2 is a graph showing milk production variances between a group of ruminants given feed supplemented with CLA and in a control group (MEGALAC) over time.

This same study evaluated the animal's protein production. Protein production is the result of multiplying the number of kilos of milk produced by the protein level in the milk, the only means for the protein production not to rise would be an equivalent fall in milk production when compared with the rise in protein production. FIG. 2, attached, compares milk production for the diet with CLA (----☐--) and the control diet (MEGALAC; -☐-) over time, and the lactation curves show that the opposite is true.

Average milk production during the pre-testing period, during the period when the two diets were supplied and during the residual effect phase for the CLA and Control diets can be seen in TABLE 1.2.

TABLE 1.2

Kilos of milk produced per animal receiving CLA "versus" the Control diet.

| | Average milk production (kg) Pre-Treatment | Treatment effect | Residual effect |
|---|---|---|---|
| CLA | 16.9 | 16.6 | 13.0 |
| Control | 17.0 | 15.8 | 12.0 |

The results of the average daily production of proteins for the "Treatment Effect" and the "Residual Effect" period can be seen in TABLE 1.3:

TABLE 1.3

Daily kilos of milk protein produced by animals receiving CLA "versus" the Control diet for 56 days and the residual effect over the next 28 days.

| | Periods | |
|---|---|---|
| | Treatment Effect | Residual effect |
| Number of days | 56 | 28 |
| CLA | 511 g | 392 g |
| CONTROL | 439 g | 338 g |

Protein production increased 16.4% during CLA supplementation and remained at 15.9% during the "Residual Effect" period.

In FIG. 2 we can see that CLA supplementation improved the cow's persistence. The linear regression of each curve after the peak allows us to estimate that the reduction in weekly milk production is 0.601 kg for the CONTROL animals compared with 0.549 kg for the animals fed with CLA. These values allow us to estimate the persistence of the groups as 13% for the CLA animals and 15% for the CONTROL animals.

Example 2

The animals of EXAMPLE 1 had milk samples taken weekly to determine the level of milk urea nitrogen (MUN). An analysis of the samples each week used a specific standard curve and a control sample was used as control. The control sample allowed comparisons of analysis from different runs. The correction factor is equal to the value of the control sample obtained in each run divided by the average of the average of all of the findings in the control sample.

The MUN analyses enable an evaluation of whether any protein increase obtained in EXAMPLE 1 occurred as a result of a higher level of urea plasma passing into the milk and not greater protein synthesis in the mammary gland. The average levels for the different diets during the supplementation period can be seen in TABLE 2.1.

TABLE 2.1

Milk urea content in milk of animals supplemented "versus" Control animals over 56 days and during the residual period.

| | MUN (mg/100 ml) | |
|---|---|---|
| | Treatment Effect | Residual Effect |
| CLA | 19.31 | 17.91 |
| CONTROL | 19.71 | 18.50 |

As can be seen, the MUN values are practically identical for both diets, therefore the higher protein levels for animals receiving CLA is not due to increased urea in the milk.

Example 3

EXAMPLE 3 shows the improved energy balance which allows for better reproductive performance. The data can be seen in TABLE 3.1.

TABLE 3.1

Reproductive data from animals supplemented with CLA "versus" Control diets over 56 days up to the month of September 2000.

| | Cows with at least 1 Estrus Cycle | Cows with Pregnancy Confirmed | Service Period of Pregnant Cows (Days) |
|---|---|---|---|
| CLA | 100.00% | 60.00% | 100 |
| CONTROL | 73.33% | 46.67% | 151 |

CONCLUSION

In EXAMPLE 1, the method involves supplementation of 150 g/day of fatty acid calcium salts (60% mixture of different linoleic acids with trans isomers) from the 4th to the 11th week to lactating crossbred animals grazing on pasture, with the remainder of the diet composed of a balanced concentrate which included the aforementioned CLA dosage. The content of protein produced by the animals receiving the fatty acid mix (CLA) was 10.79% higher than the control group. The effects of removal of the supplement after 56 days and the residual effect over 28 days were also analyzed. The increase in production of proteins was 16.4% during CLA supplementation and this remained at 15% during the "Residual Effect" period.

In EXAMPLE 2, which used the same experimental units as EXAMPLE 1, which proves that the increased protein level is not caused solely by the inclusion of more urea in the milk, as the levels or ureic nitrogen in both diets is practically identical.

In EXAMPLE 3, which also used data from the same experimental units as EXAMPLE 1, the effects of CLA in improving animal reproduction performance are demonstrated.

The invention claimed is:

1. A method of improving reproductive performance in a cow with at least one estrus cycle, comprising:
    administering to a healthy, female cow with at least one estrus cycle a composition including at least one conjugated linoleic acid chosen from C18:2 cis 9, trans 11; C18:2 trans 10, cis 12; C18:2 cis8, trans 10; C18:2 trans 9, cis 11; and mixtures thereof;
    wherein the composition is administered in an amount such that the healthy, female cow with at least one estrus cycle absorbs 1 g to 95 g of the at least one conjugated linoleic acid per day
    wherein improvement in reproductive performance of the healthy, female cow with at least one estrus cycle is measured by the percentage of pregnant females in a first plurality of healthy, female cows with at least one estrus cycle having been administered said composition as compared to the percentage of pregnant females in a second plurality of healthy, female cows with at least one estrus cycle that have not been administered said composition.

2. The method of claim 1, wherein the composition is added to a concentrate or a multiple mixture supplement and administered in amounts from 0.01 g to 2.5 g per kilogram of liveweight per day, to cause 0.01 g to 0.15 g of the at least one conjugated linoleic acid to be absorbed per day per kilogram of the cow with at least one estrus cycle.

3. The method of claim 1, wherein the composition further comprises one or more ingredients chosen from fish meal, soybean meal, cottonseed meal, meat meal, feather meal, blood meal, wheat middlings, soybean hulls, yeast, corn grain, citrus pulp, sorghum grain, and mixtures thereof.

4. The method of claim 1, further comprising providing 0.5% to 90% in mass of the at least one conjugated linoleic acid, in relation to the total mass of the mixture of lipids added to the ration or diet of the cow with at least one estrus cycle.

5. The method of claim 1, wherein the at least one conjugated linoleic acid is in the form of calcium salt, or is in a mixture with amides or formaldehydes in order to reduce its degradation in the rumen.

6. The method of claim 1, wherein the composition further includes one or more additives chosen from flavoring agents, coloring agents, vitamins, minerals, conditioners, stabilizers, and mixtures thereof.

7. A method of improving reproductive performance in a plurality of healthy, female, cows with at least one estrus cycle, comprising:
    administering to a plurality of healthy, female cows with at least one estrus cycle a composition including at least one conjugated linoleic acid chosen from C18:2 cis 9, trans 11; C18:2 trans 10, cis 12; C18:2 cis8, trans 10; C18:2 trans 9, cis 11; and mixtures thereof;
    wherein the composition is administered in an amount such that each healthy, female cow with at least one estrus cycle absorbs 1 g to 95 g of the at least one conjugated linoleic acid per day; and wherein any improvement in reproductive performance is measured by the percentage of pregnant females in the plurality of healthy, female cows with at least one estrus cycle after administration of said composition.

8. The method of claim 7, wherein any improvement in reproductive performance is measured by the percentage of pregnant females in the plurality of healthy, female cows with at least one estrus cycle after administration of said composition as compared to the percentage of pregnant females in a second plurality of healthy, female cows with at least one estrus cycle that have not been administered said composition.

9. The method of claim 1, wherein the conjugated linoleic acid is in the form of a calcium salt thereof.

* * * * *

UNITED STATES PATENT AND TRADEMARK OFFICE
CERTIFICATE OF CORRECTION

Page 1 of 1

PATENT NO. : 11,147,293 B2
APPLICATION NO. : 12/175716
DATED : October 19, 2021
INVENTOR(S) : Dante Pazzanese Duarte Lanna et al.

It is certified that error appears in the above-identified patent and that said Letters Patent is hereby corrected as shown below:

On the Title Page

Column 1, "Applicants" was omitted. Please add --Applicants: Dante Pazzanese Duarte Lanna, Piracicaba, Brazil; Mark A. McGuire, Moscow, ID; Sergio Raposo de Medeiros, Piracicaba, Brazil; Dimas Estrasulas de Oliveira, Piracicaba, Brazil; Luis Januario M. Aroeira, Minas Gerais, Brazil--.

In the Specification

Column 2, Line 51, "FEALQ, 1996)," should be --FEALQ, (1996),--.

Column 4, Line 37, "including supplements, which present" should be --including supplements which present--.

Column 5, Lines 38-39, "example presented below shows how the use of these sources" should be --example presented below shows the use of these sources--.

Column 6, Line 43, "enables" should be --enable--.

In the Claims

Column 10, Line 59 (Claim 7) "female, cows" should be --female cows--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*